(12) United States Patent
So et al.

(10) Patent No.: US 10,324,664 B2
(45) Date of Patent: Jun. 18, 2019

(54) MEMORY CONTROLLER WHICH EFFECTIVELY AVERAGES THE NUMBERS OF ERASE TIMES BETWEEN PHYSICAL BLOCKS WITH HIGH ACCURACY

(71) Applicant: Panasonic Intellectual Property Management Co., Ltd., Osaka (JP)

(72) Inventors: Hirokazu So, Kyoto (JP); Toshiyuki Honda, Kyoto (JP); Shigekazu Kogita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 440 days.

(21) Appl. No.: 15/079,901

(22) Filed: Mar. 24, 2016

(65) Prior Publication Data
US 2016/0283163 A1 Sep. 29, 2016

(30) Foreign Application Priority Data
Mar. 26, 2015 (JP) .................. 2015-064591

(51) Int. Cl.
*G06F 3/06* (2006.01)
*G06F 12/02* (2006.01)

(52) U.S. Cl.
CPC ............ *G06F 3/0679* (2013.01); *G06F 3/064* (2013.01); *G06F 3/0616* (2013.01); *G06F 12/02* (2013.01);

(Continued)

(58) Field of Classification Search
None
See application file for complete search history.

(56) References Cited

U.S. PATENT DOCUMENTS

| 5,210,865 A | * | 5/1993 | Davis ................. G06F 11/2082 714/6.1 |
| 7,065,607 B2 | * | 6/2006 | England ............... G11C 16/102 377/26 |

(Continued)

FOREIGN PATENT DOCUMENTS

| JP | 2007-133683 A | 5/2007 |
| JP | 2011-203916 A | 10/2011 |
| WO | 2006/067839 A1 | 6/2006 |

*Primary Examiner* — Reginald G Bragdon
*Assistant Examiner* — James J. Thomas
(74) *Attorney, Agent, or Firm* — McDermott Will & Emery LLP

(57) ABSTRACT

A memory controller includes: a memory that holds a physical block counter including the number of erase times, a logical block counter including the number of write times, and a logical-physical conversion table; and a control unit that writes data to any physical block address. When the control unit receives a writing data instruction, the control unit updates the number of write times corresponding to the write destination logical block address, if the number of write times corresponding to the write destination logical block address is large, the control unit allocates to the write destination logical block address a physical block address with the number of erase times which is small among spare blocks not allocated to the logical block addresses in the logical-physical conversion table, updates the number of erase times corresponding to the allocated physical block address, and updates the logical-physical conversion table.

1 Claim, 11 Drawing Sheets

(52) U.S. Cl.
CPC .. *G06F 12/0246* (2013.01); *G06F 2212/2022* (2013.01); *G06F 2212/7201* (2013.01); *G06F 2212/7211* (2013.01)

(56) References Cited

U.S. PATENT DOCUMENTS

| | | | |
|---|---|---|---|
| 9,317,422 B1* | 4/2016 | Winters | G11C 16/22 |
| 2007/0101047 A1 | 5/2007 | Kamiya et al. | |
| 2007/0103992 A1 | 5/2007 | Sakui et al. | |
| 2011/0238890 A1* | 9/2011 | Sukegawa | G06F 12/0246 |
| | | | 711/103 |
| 2013/0198436 A1* | 8/2013 | Bandic | G11C 13/0035 |
| | | | 711/103 |
| 2014/0215136 A1* | 7/2014 | Gole | G06F 3/0616 |
| | | | 711/103 |
| 2014/0365798 A1* | 12/2014 | Wen | G06F 1/3228 |
| | | | 713/323 |

* cited by examiner

Logical-physical conversion table

| Logical block address | Physical block address |
|---|---|
| 0 | aaa |
| 1 | bbb |
| 2 | ccc |
| 3 | ddd |
| 4 | eee |
| ... | ... |
| N-1 | nnn |
| Spare #0 | ppp |
| Spare #1 | qqq |
| ... | ... |
| Spare #M-1 | zzz |

301 — Logical block address
302 — Physical block address

Physical block counter

| Physical block address | The number of erase times |
|---|---|
| aaa | 99 |
| bbb | 37 |
| ccc | 125 |
| ddd | 42 |
| eee | 5 |
| . | . |
| . | . |
| . | . |
| ppp | 3 |
| qqq | 20 |
| . | . |
| . | . |
| . | . |
| zzz | 78 |

302 — Physical block address
303 — The number of erase times

FIG. 4

117c
Logical block counter

| Logical block address | Number of write times |
|---|---|
| 0 | 139 |
| 1 | 8 |
| 2 | 25 |
| 3 | 61 |
| 4 | 3 |
| . | . |
| . | . |
| . | . |
| N-1 | 2 |

Logical block counter

| logical block address (301) | The number of write times A (304a) | The number of write times B (304b) | The number of write times C (304c) |
|---|---|---|---|
| 0 | 68 | 73 | 1 |
| 1 | 0 | 8 | 4 |
| 2 | 5 | 10 | 1 |
| 3 | 1 | 55 | 256 |
| 4 | 3 | 12 | 2 |
| ... | ... | ... | ... |
| N-1 | 2 | 1 | 1 |
| Total | 1000 | 1000 | 569 |

305

| A set of numbers of write times to be updated |
|---|
| The number of write times C |

MEMORY CONTROLLER WHICH EFFECTIVELY AVERAGES THE NUMBERS OF ERASE TIMES BETWEEN PHYSICAL BLOCKS WITH HIGH ACCURACY

RELATED APPLICATIONS

This application claims the benefit of priority of Japanese Application No. 2015-064591, filed on Mar. 26, 2015, the disclosure of which is incorporated by reference herein.

BACKGROUND OF THE INVENTION

1. Field of the Invention

The present disclosure relates to a memory controller controlling a data rewritable non-volatile memory, a non-volatile storage device, a non-volatile storage system and a memory control method.

2. Description of the Related Art

A conventional semiconductor storage device has a plurality of physical blocks and each of the plurality of physical blocks is a unit of erasing data. A method is known that is used in the semiconductor storage device for averaging the numbers of erase times between the plurality of physical blocks. In this averaging method, the numbers of erase times between the plurality of physical blocks are averaged using a management table for counting the number of erase times for each of the plurality of physical blocks and a management table for counting the number of write times for each of a plurality of logical blocks (for example, see PTL 1).

CITATION LIST

Patent Literature

PTL 1: Unexamined Japanese Patent Publication No. 2011-203916

SUMMARY OF THE INVENTION

The present disclosure provides a memory controller which effectively averages the numbers of erase times between the plurality of physical blocks with high accuracy, and also provides a non-volatile storage device, a non-volatile storage system and a memory control method.

A memory controller in accordance with the present disclosure writes data to a non-volatile memory having a plurality of physical blocks and reads data from the non-volatile memory, and includes: a memory configured to hold a physical block counter recording the number of erase times for each of the plurality of physical blocks, a logical block counter recording the number of write times for each of a plurality of logical blocks, and a logical-physical conversion table recording a correspondence between logical block addresses of the plurality of logical blocks and physical block addresses of the plurality of physical blocks; a control unit configured to manage the physical block counter, the logical block counter and the logical-physical conversion table, and to write data to any physical block addresses among the physical block addresses corresponding to a predetermined logical block address among the logical block addresses based on the logical-physical conversion table; and a host interface configured to connect to an external device, and to transmit data and receive data. When the control unit receives a writing data instruction including a write destination logical block address from the host interface, the control unit updates the number of write times corresponding to the write destination logical block address in the logical block counter, and, if the number of write times corresponding to the write destination logical block address in the logical block counter is relatively large, the control unit allocates to the write destination logical block address a physical block address with the number of erase times which is relatively small in the physical block counter, among spare blocks not allocated to the logical block addresses in the logical-physical conversion table, updates the number of erase times corresponding to the allocated physical block address in the physical block counter, and updates the logical-physical conversion table. Also, if a state of the external device is changed, the control unit resets the number of write times in the logical block counter to a predetermined value.

A memory controller, a non-volatile storage device, a non-volatile storage system and a memory control method in accordance with the present disclosure make it possible to average the number of erase times between the plurality of physical blocks with a high accuracy.

BRIEF DESCRIPTION OF DRAWINGS

FIG. 2 is a diagram illustrating a configuration of a physical-logical conversion table in accordance with the first exemplary embodiment;

FIG. 3 is a diagram illustrating a configuration of a physical block counter in accordance with the first exemplary embodiment;

FIG. 4 is a diagram illustrating a configuration of a logical block counter in accordance with the first exemplary embodiment;

FIG. 11 is a diagram illustrating a configuration of a logical block counter in accordance with a second exemplary embodiment.

DETAILED DESCRIPTION OF THE PREFERRED EMBODIMENTS

Hereinafter, an exemplary embodiment will be described with reference to the accompanying drawings as appropriate. However, unnecessarily detailed description may occasionally be omitted. For example, detailed description of well-known matters and redundant description of substantially the same configuration may occasionally be omitted. This is to avoid the following description from becoming unnecessarily redundant, and to allow any person skilled in the art to easily understand the description.

Also, it should be noted that the following description and the accompanying drawings are provided to allow any person skilled in the art to fully understand the present disclosure, and that it is not intended to limit the subject matter described in the claims by the following description.

First Exemplary Embodiment

The first exemplary embodiment will be described with reference to FIGS. 1 to 10.

1-1. Configuration 1-1-1. Configuration of a Non-volatile Storage System

Figure 1:
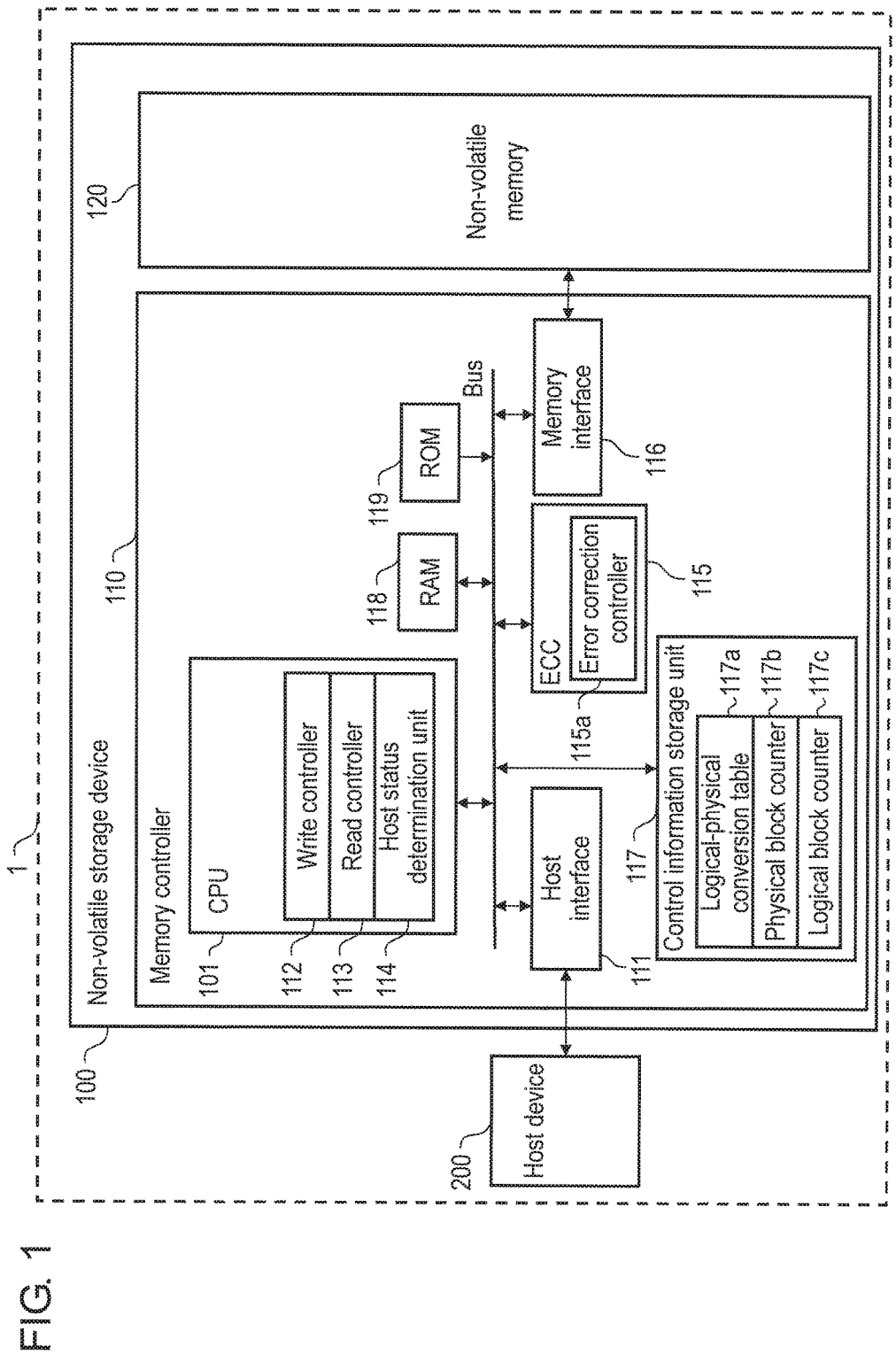
FIG. 1 is a diagram illustrating a configuration of a non-volatile storage system in accordance with a first exemplary embodiment.

FIG. 1 is a diagram illustrating a configuration of a non-volatile storage system in accordance with a first exemplary embodiment. In FIG. 1, non-volatile storage system 1 includes non-volatile storage device 100 and host device 200.

Non-volatile storage device 100 is, for example, a Solid State Drive (SSD), which is a semiconductor memory device. Non-volatile storage device 100 may also be an SD memory card, a CompactFlash (Registered Trademark), a flash drive, or an embedded memory device. Non-volatile storage device 100 is capable of storing digital data of various contents (hereinafter referred to as content data) including, for example, moving pictures, still pictures, sounds, texts. Non-volatile storage device 100 is connectable to host device 200. Host device 200 is an example of an external device.

Non-volatile storage device 100 includes memory controller 110 and non-volatile memory 120.

Host device 200 records content data in non-volatile storage device 100, and reads content data from non-volatile storage device 100. Host device 200 is, for example, an electronic device such as a digital camera, a personal computer, a smartphone, a tablet terminal, or a television set.

Non-volatile memory 120 is a recording element capable of holding content data without power. Non-volatile memory 120 is configured by a Not AND (NAND) flash memory.

1-1-2. Configuration of a Memory Controller

Next, a configuration of memory controller 110 of non-volatile storage device 100 will be described. Memory controller 110 receives a command from host device 200, and controls to write content data in non-volatile memory 120 and to read content data from non-volatile memory 120.

Memory controller 110 includes Central Processing Unit (CPU) 101, which is a control unit or a processor, host interface 111, Error Correcting Code (ECC) circuit 115, memory interface 116, control information storage unit 117, Random Access Memory (RAM) 118, and Read-Only Memory (ROM) 119, all of which are connected to memory controller 110 via a bus.

CPU 101 is an operation unit which executes various application programs and the like.

Host interface 111 is an interface which is controlled by CPU 101 to transmit data to host device 200 and to receive data from host device 200, where the data includes, for example, commands and content data.

Memory interface 116 is an interface which is controlled by CPU 101 to write data in non-volatile memory 120, to read data from non-volatile memory 120, and to erase data from non-volatile memory 120.

ECC circuit 115 is an error correcting circuit which encodes data stored and decodes stored data. Error correction controller 115a, which is included and functions in ECC circuit 115, corrects an error caused in the content data written into non-volatile memory 120.

Control information storage unit 117 is a memory which stores control information processed by CPU 101 and management information for non-volatile memory 120.

RAM 118 is used as a storage area for storing a program executed by CPU 101 or changing parameters timely during executing the program, and as a work area for the program. ROM 119 stores programs executed by CPU 101 and fixed data used as operation parameters.

CPU 101 includes write controller 112, read controller 113, and host status determination unit 114.

Write controller 112 controls to write content data received by host interface 111 to non-volatile memory 120.

Read controller 113 controls to output content data stored in non-volatile memory 120 to host device 200 through host interface 111.

Host status determination unit 114 determines a state of host device 200 is changed. Specifically, host status determination unit 114 updates all values at once in logical block counter 117c in triggering a command from host device 200, although details will be described later.

Control information storage unit 117 is a storage area for storing logical-physical conversion table 117a, physical block counter 117b, and logical block counter 117c.

Incidentally, control information storage unit 117 may not be disposed on memory controller 110, and may be disposed on non-volatile memory 120 or may be disposed on a Dynamic Random Access Memory (DRAM) which is accessible from memory controller 110.

FIG. 2 is a diagram illustrating a configuration of physical-logical conversion table 117a in accordance with the present exemplary embodiment. Logical-physical conversion table 117a is a table which stores information indicating correspondence between logical block addresses 301 used by host device 200 and physical block addresses 302 of non-volatile memory 120. In logical-physical conversion table 117a, the blocks to which addresses used by host device 200 are not allocated, are spare blocks and a physical block address is recorded in correspondence with each spare block.

In FIG. 2, logical-physical conversion table 117a indicates that logical block address "0" corresponds to physical block address "aaa", logical block address "1" corresponds to physical block address "bbb", logical block address "2" corresponds to physical block address "ccc", logical block address "3" corresponds to physical block address "ddd", logical block address "4" corresponds to physical block address "eee", and logical block address "N−1" (N is a natural number equal to or larger than 1) corresponds to physical block address "nnn".

Also, in FIG. 2, logical-physical conversion table 117a has M spare blocks (M is a natural number equal to or larger than 1) including "spare #0", "spare #1" to "spare #(M−1)". Physical block address "ppp" is recorded in spare block "spare #0", physical block address "qqq" is recorded in spare block "spare #1", and physical block address "zzz" is recorded in spare block "spare #(M−1)".

FIG. 3 is a diagram illustrating a configuration of physical block counter 117b in accordance with the present exemplary embodiment. To manage the number of erase times corresponding to each of the physical blocks configuring non-volatile memory 120, physical block counter 117b stores a table indicating a correspondence between physical block address 302 and the number of erase times 303.

In FIG. 3, physical block counter 117b indicates that the number of erase times corresponding to physical block address "aaa" is "99", the number of erase times corresponding to physical block address "bbb" is "37", the number of erase times corresponding to physical block address "ccc" is "125", the number of erase times corresponding to physical block address "ddd" is "42", the number of erase times corresponding to physical block address "eee" is "5", the number of erase times corresponding to physical block address "ppp" is "3", the number of erase times corresponding to physical block address "qqq" is "20", and the number of erase times corresponding to physical block address "zzz" is "78".

FIG. 4 is a diagram illustrating a configuration of logical block counter 117c in accordance with the present exemplary embodiment. Logical block counter 117c stores a table indicating a correspondence between each logical block address 301 to which host device 200 wrote data and the number of write times 304 which is the number of times of writing data to the logical block address 301.

In FIG. 4, logical block counter 117c indicates that the number of write times corresponding to logical block address "0" is "139", the number of write times corresponding to logical block address "1" is "8", the number of write times corresponding to logical block address "2" is "25", the number of write times corresponding to logical block address "3" is "61", the number of write times corresponding to logical block address "4" is "3", and the number of write times corresponding to logical block address "N−1" is "2".

1-1-3. Configuration of a Non-volatile Memory

Figure 5:
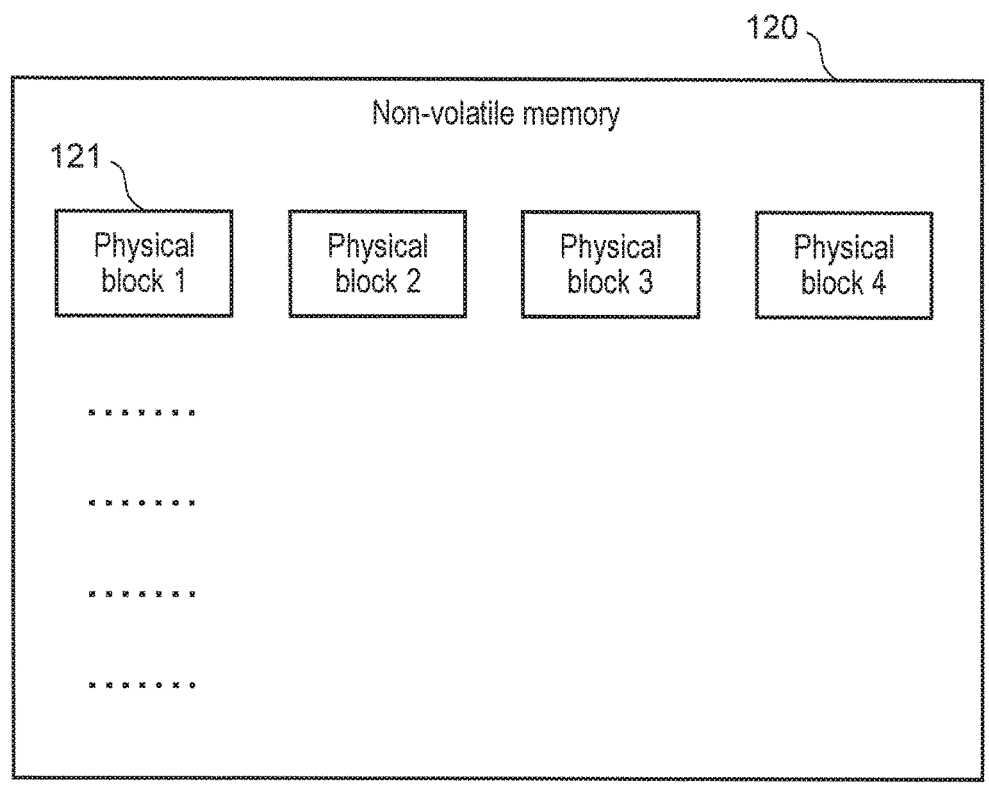
FIG. 5 is a diagram illustrating a configuration of a plurality of physical blocks, which are recording areas of a non-volatile memory in accordance with the first exemplary embodiment.

Next, a configuration of non-volatile memory 120 of non-volatile storage device 100 will be described. FIG. 5 is a diagram illustrating a configuration of a plurality of physical blocks, which are recording areas of non-volatile memory 120 in accordance with the present exemplary embodiment.

Non-volatile memory 120 is configured by a plurality of physical blocks 121. Each physical block 121 is a unit of erasing data and data are erased in the unit. To store data in non-volatile memory 120, it is necessary to erase data in the unit of physical block 121 and then to write data into physical block 121 which is erased data. New data cannot be written in physical block 121 without erasing data in the physical block 121. Also, a physical upper limit of the number of erase times, corresponding to each physical block 121, exists.

1-1-4. Configuration of a Host Device

Figure 6:
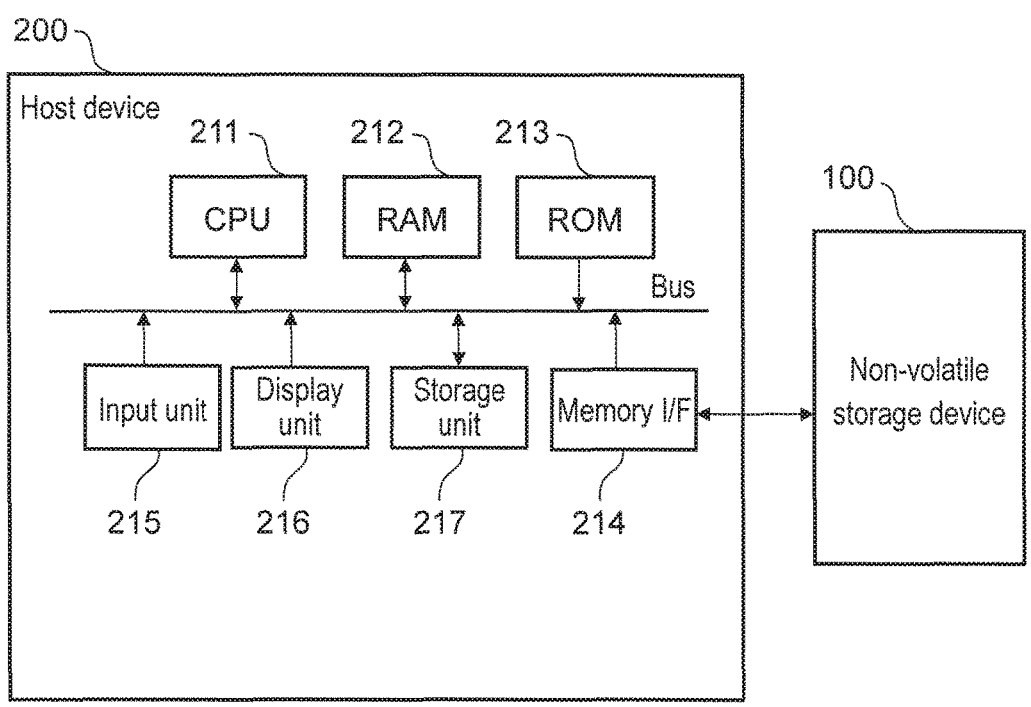
FIG. 6 is a configuration diagram of a host device in accordance with the first exemplary embodiment.

Next, a configuration of host device 200 will be described. FIG. 6 is a configuration diagram illustrating a host device in accordance with the present exemplary embodiment.

Host device 200 is a device which is connectable to non-volatile storage device 100.

Host device 200 includes CPU 211, RAM 212, ROM 213, and memory interface 214, which are connected via a bus. Host device 200 further includes input unit 215, display unit 216, and storage unit 217, which are connected by predetermined interfaces via the bus.

CPU 211 is an operation unit which executes various application programs. RAM 212 is used as a storage area for a program executed by CPU 211 or changing parameters timely during executing the program, and as a work area for the program. ROM 213 stores programs executed by CPU 211 or fixed data used as operation parameters.

Memory interface 214 is an interface which is controlled by CPU 211 to transmit data, which includes, for example, commands and content data, to non-volatile storage device 100, and to receive data.

Input unit 215 includes a key, a button, a touch panel, a mouse, a keyboard, or the like, that is operated by a user to input various instructions to CPU 211.

Display unit 216 is, for example, a liquid crystal display or an electroluminescence (EL) display, and displays various kinds of information by texts, images or the like.

Storage unit 217 includes a flash memory or a hard disk, such as an information storage medium.

1-2. Operations

Operations of non-volatile storage device 100 configured as above will be described hereinafter.

1-2-1. Writing Data Operation

First, a writing data operation of non-volatile storage device 100 will be described.

Figure 7:
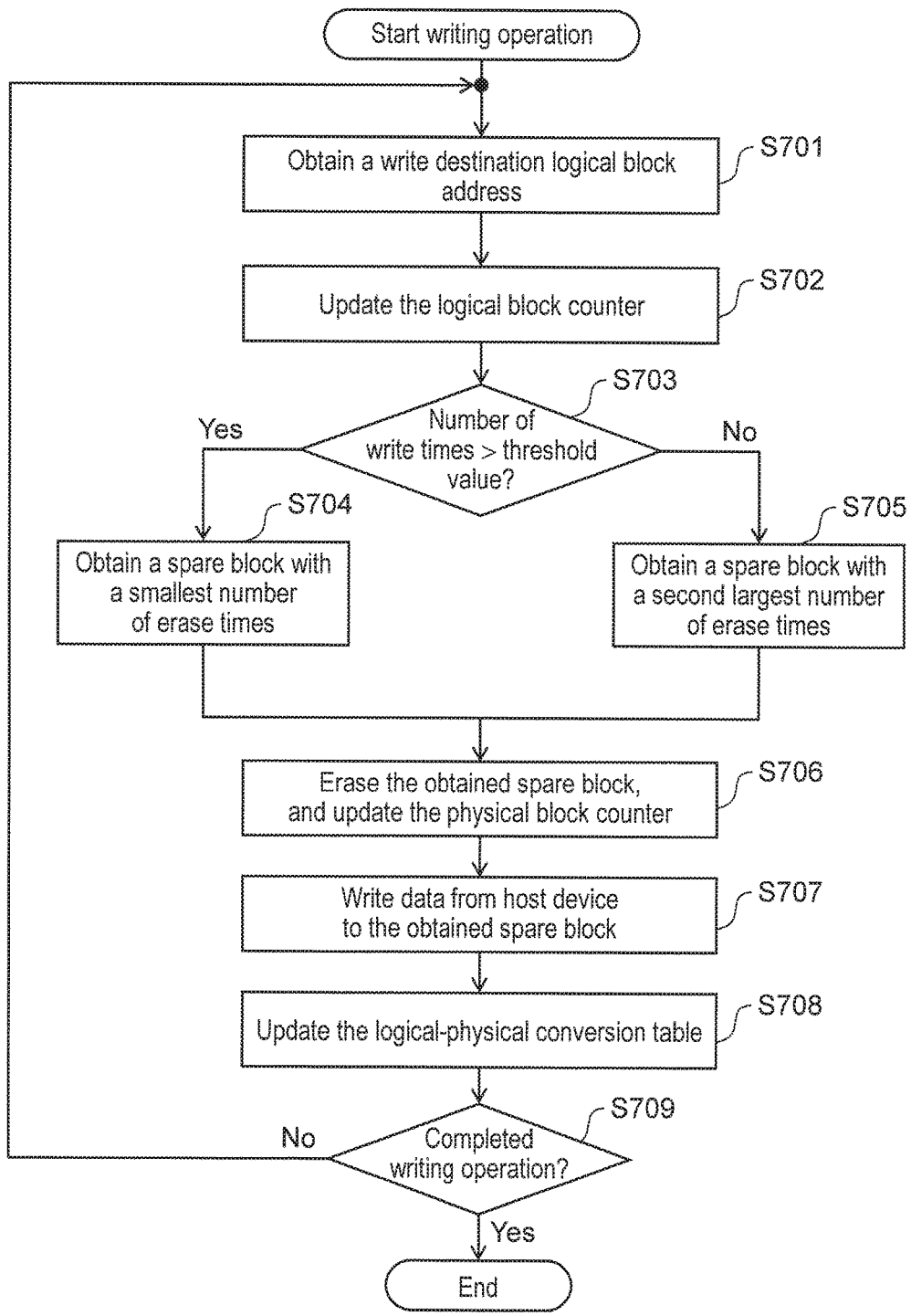
FIG. 7 is a flowchart showing an operation of the non-volatile storage device at the time of receiving a write command in accordance with the first exemplary embodiment.

FIG. 7 is a flowchart showing an operation of non-volatile storage device 100 at the time of receiving a data write command in accordance with the present exemplary embodiment.

When host device 200 writes content data into non-volatile storage device 100, host device 200 issues a write command and notifies memory controller 110 in non-volatile storage device 100 of the write command with specifying the write destination address.

(S701) Host interface 111 of memory controller 110 receives the write command and the write destination logical block address. As an example, the following writing operation will be described in a case that the write destination logical block address is "0" or "4".

(S702) Next, write controller 112 in CPU 101 increments the value of logical block counter 117c corresponding to the write destination logical block address received by host interface 111. For example, assume that the state of logical block counter 117c is as shown in FIG. 4 before host interface 111 receives the write command. In the case that the received write destination logical block address is "0", write controller 112 increments the number of write times from "139" to "140". In the case that the received write destination logical block address is "4", write controller 112 increments the number of write times from "3" to "4".

(S703) Next, write controller 112 compares the number of write times 304 of logical block counter 117c corresponding to the write destination logical block address received by host interface 111 with a threshold value. If the corresponding number of write times 304 of logical block counter 117c exceeds the threshold value (in the case of Yes), the process proceeds to step S704. If the corresponding number of write times 304 of logical block counter 117c does not exceed the threshold value (in the case of No), the process proceeds to step S705.

In the present exemplary embodiment, a value used as the threshold value is an average value of the numbers of write times 304 stored in logical block counter 117c. In the case of logical block counter 117c shown in FIG. 4, for example, assume that the average value calculated by $((139+8+25+61+3+ \ldots +2)+1)/N$ be "10". In the case that the write destination logical block address received by host interface 111 is "0", the number of write times is "140", which exceeds the threshold value, so that the process proceeds to step S704. In the case that the write destination logical block address received by host interface 111 is "4", the number of write times is "4", which does not exceed the threshold value, so that the process proceeds to step S705.

(S704) Write controller 112 obtains a spare block corresponding to physical block address 302 at which the number of erase times 303 is the smallest. In more detail, write controller 112 obtains physical block addresses 302 of spare blocks to which logical block addresses 301 are not allocated in logical-physical conversion table 117a. Write controller 112 also refers to physical block counter 117b to obtain the numbers of erase times 303 for the respective spare blocks. Then, write controller 112 determines a spare block with the smallest number of erase times 303 among obtained numbers of erase times 303.

Specifically, referring to logical-physical conversion table 117a shown in FIG. 2, spare blocks to which logical block address 301 are not allocated are spare blocks "spare #0", "spare #1" and "spare #(M−1)", and their corresponding physical block addresses 302 are "ppp", "qqq" and "zzz", respectively. Referring to physical block counter 117b shown in FIG. 3, the numbers of erase times 303 corresponding to physical block addresses 302 of "ppp", "qqq" and "zzz" are "3", "20" and "78", respectively. The spare block with the smallest number of erase times 303 of "3" is the spare block "spare #0".

Incidentally, the spare block obtained may not be limited to the one with the smallest number of erase times, and may be a spare block with a relatively small number of erase times.

(S705) Write controller 112 obtains a spare block corresponding to a physical block with the second largest number of erase times. In more detail, write controller 112 obtains physical block addresses 302 of spare blocks to which logical block addresses 301 are not allocated in logical-physical conversion table 117a. Write controller 112 also refers to physical block counter 117b to obtain the numbers of erase times 303 for the respective spare blocks. Then, write controller 112 determines a spare block with the second largest one of the obtained numbers of erase times 303.

Specifically, referring to logical-physical conversion table 117a shown in FIG. 2, spare blocks to which logical block addresses 301 are not allocated are spare blocks "spare #0", "spare #1" and "spare #(M−1)", and their corresponding physical block addresses 302 are "ppp", "qqq" and "zzz", respectively. Referring to physical block counter 117b shown in FIG. 3, the numbers of erase times 303 corresponding to physical block addresses 302 "ppp", "qqq" and "zzz" are "3", "20" and "78", respectively. The spare block with the second largest number of erase times "20" is the spare block "spare #1".

Incidentally, the spare block to be obtained may not be limited to the one with the second largest number of erase times. For example, the spare block to be obtained may be a spare block with the number of erase times which is neither the smallest number nor the largest number, or may be a spare block with the number of erase times which is a relatively large number or an average number.

The reason why the spare block with the smallest number of erase times is not obtained here is that data are thought to be written into a logical block address corresponding to the number of write times which does not exceed the threshold value in step S703, that is, host device 200 seldom writes data in the logical block address. If data from host device 200 are written into a spare block with the smallest number of erase times and the corresponding physical block address is allocated to a logical block to which host device 200 seldom writes data, it is likely that this logical block will be maintained in a state being small in the number of erase times. Accordingly, it is thought that the difference between the number of erase times of the physical block and those of other physical blocks will expand. To avoid this situation, the spare block with the minimum number of erase times is not selected here.

Also, the reason why the spare block with the largest number of erase times is not obtained here is that, if the spare block with the largest number of erase times is allocated, data from host device 200 are written into the allocated physical block, so that the number of erase times corresponding to the allocated physical block increases further from the largest value. Since the physical upper limit for the number of erase times, as described before, exists, it is undesirable to increase the number of erase times corresponding to a physical block with the largest number of erase times.

(S706) Write controller 112 increments the value of the number of erase times 303 corresponding to the physical block address of the obtained spare block in physical block counter 117b, and erases the obtained spare block. Specifically, for example, assume that physical block counter 117b before host interface 111 receives the write command be as shown in FIG. 3. If the physical block address of the obtained spare block is "ppp", the number of erase times 303 corresponding to the physical block address is incremented from "3" to "4". If the physical block address of the obtained spare block is "qqq", the number of erase times 303 corresponding to the physical block address is incremented from "20" to "21".

(S707) Host device 200 transmits content data to non-volatile storage device 100. Host interface 111 receives the content data from host device 200. Write controller 112 writes the received content data into the spare block which has been erased in step S706.

(S708) Next, write controller 112 updates logical-physical conversion table 117a so as to allocate the spare block in which the content data have been written in step S707 to a logical block address. Assume, for example, that logical-physical conversion table 117a before host interface 111 receives the write command be as shown in FIG. 2. If the received write destination logical block address is "0" and the physical block address of the spare block used for data writing is "ppp", the physical block address corresponding to logical block address "0" in logical-physical conversion table 117a is changed from "aaa" to "ppp", and the physical block address corresponding to logical block address "spare #0" is changed from "ppp" to "aaa". Also, if the received write destination logical block address is "4" and the physical block address allocated to the spare block used for data writing is "qqq", the physical block address corresponding to logical block address "4" in logical-physical conversion table 117a is changed from "eee" to "qqq", and the physical block address corresponding to logical block address "spare #1" is changed from "qqq" to "eee".

(S709) It is determined whether writing of all of the content data from host device 200 has been completed. If writing of all of the content data from host device 200 has been completed (in the case of Yes), processing in response to the write command is terminated, and, if the content data from host device 200 remains (in the case of No), the process returns to S701.

1-2-2. Reset Operation

Figure 8:
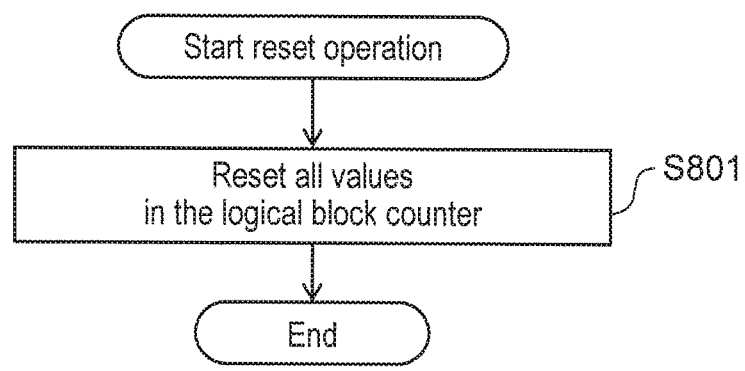
FIG. 8 is a flowchart showing an operation of the non-volatile storage device at the time of receiving a reset command in accordance with the first exemplary embodiment.

Next, a reset operation for memory controller 110 of non-volatile storage device 100 will be described. FIG. 8 is a flowchart showing an operation of non-volatile storage device 100 at the time of receiving a reset command in accordance with the present exemplary embodiment.

CPU 211 of host device 200 issues a reset command to memory controller 110 when host device 200 significantly changes the pattern of issuing a write command to memory controller 110.

Examples of significantly changing the pattern of issuing the write command include: an example in which host device 200 reformats a file system of memory controller 110; an example in which host device 200 deletes all of content data stored in memory controller 110; an example in which host device 200 reconfigures logical partitions; and an example in which host device 200 moves all of logical block addresses stored content data by defragmenting the file system.

(S801) CPU 211 of host device 200 issues a reset command to notify memory controller 110 that host device 200 will significantly change the pattern of issuing the write command through memory interface 214. When host interface 111 in memory controller 110 receives the reset command, host status determination unit 114 of memory controller 110 determines that a state of host device 200 is changed, and resets all values of the numbers of write times 304 in logical block counter 117c to "0".

Since values of the numbers of write times 304 in logical block counter 117c accumulated by accesses from the previous host device 200 are reset, it is possible to reconfigure logical block counter 117c according to an operation of new host device 200.

The reset command may not be a dedicated command, and may be included as a reset command function in another command. For example, the reset command function may be realized by using SecureErase, which is a means of erasing data in an SSD by the SECURITY ERASE UNIT command supported by an Advanced Technology Attachment (ATA) interface compliant SSD. After this command has been issued, it is likely that host device 200 will significantly change the pattern of issuing the write command. Therefore, memory controller 110 may interpret, upon receiving a SecurityErase command, that the above reset command has been issued, and may reset all values of the numbers of write times 304 in logical block counter 117c to a predetermined value.

Also, the predetermined value of the number of write times 304 may not be limited to "0", and may be a predetermined value equal to or larger than "1".

1-2-3. Preset Operation

Figure 9:
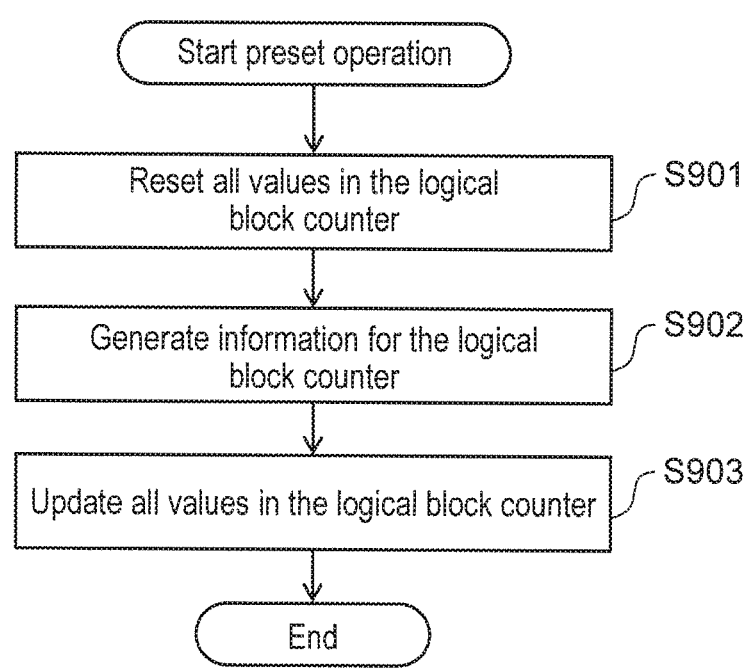
FIG. 9 is a flowchart showing an operation of the non-volatile storage device at the time of receiving a preset command in accordance with the first exemplary embodiment.

Next, a preset operation for memory controller 110 of non-volatile storage device 100 will be described. FIG. 9 is a flowchart showing an operation of non-volatile storage device 100 at the time of receiving a preset command in accordance with the present exemplary embodiment.

In a case where CPU 211 of host device 200 significantly changes the pattern of issuing the write command for memory controller 110, CPU 211 issues a preset command to memory controller 110.

The preset command differs from the above-described reset command as follows. The reset command resets all values of the numbers of write times 304 in logical block counter 117c to a predetermined value, for example, "0" as described above. On the other hand, the preset command presets all values of the numbers of write times 304 in logical block counter 117c to an arbitrary value which is directly or indirectly specified by host device 200. Accordingly, in the case of the preset command, it is possible not only to merely invalidate all values of the numbers of write times 304 in logical block counter 117c accumulated by the accesses from the previous host device 200, but also to obtain and utilize information regarding how new host device 200 will write data.

CPU 211 of host device 200 issues a preset command, and notifies memory controller 110 of writing schedule information 400 regarding a future pattern of issuing the write command. Writing schedule information 400 is generated and notified, for example, in association with each specified application or each specified mode.

Figure 10:
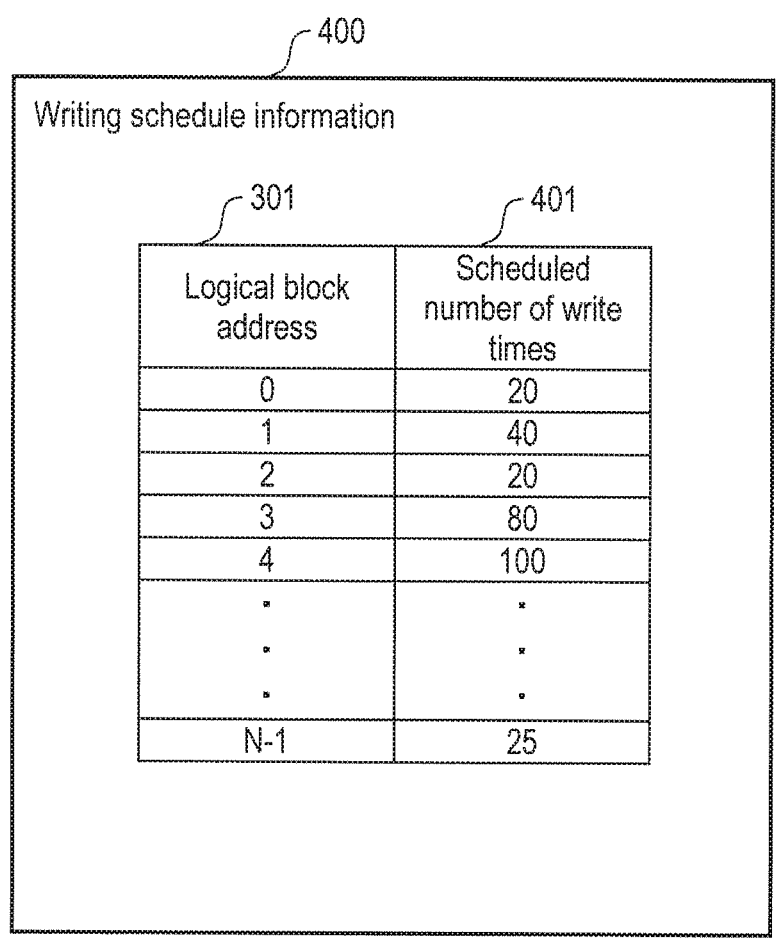
FIG. 10 is a diagram illustrating an example of writing schedule information transmitted by the host device in accordance with the first exemplary embodiment.

FIG. 10 is a diagram illustrating an example of writing schedule information transmitted by host device 200 in accordance with the present exemplary embodiment. In FIG. 10, writing schedule information 400 includes logical block address 301 and scheduled number of write times 401. Scheduled number of write times 401 is specified for each logical block address as a relative value to values for other logical block addresses within a range not exceeding a specified largest value X, such as X=100 in the present exemplary embodiment.

The writing schedule information 400 shown in FIG. 10 contains scheduled number of write times "20" corresponding to logical block address "0", scheduled number of write times "40" corresponding to logical block address "1", scheduled number of write times "20" corresponding to logical block address "2", scheduled number of write times "80" corresponding to logical block address "3", scheduled number of write times "100" corresponding to logical block address "4", and scheduled number of write times "25" corresponding to logical block address "N−1".

(S901) When host interface 111 in memory controller 110 receives the preset command, host status determination unit 114 resets all values of the numbers of write times 304 in logical block counter 117c to a predetermined value, or "0" in the present exemplary embodiment.

Here, the predetermined value may not be limited to "0", and may be any natural number equal to or larger than "1".

(S902) Next, host status determination unit 114 generates set values of the numbers of write times 304 in logical block counter 117c based on writing schedule information 400 received from host device 200. Writing schedule information 400 is set a value within a range not exceeding a specified largest value X=100. Host status determination unit 114 generates set values of the numbers of write times 304 in logical block counter 117c by converting the values in writing schedule information to specified values within a range not exceeding a specified largest value Y depending on implemented memory controller 110, or Y=1000 in the present exemplary embodiment.

More specifically, host status determination unit 114 generates, as set values of the numbers of write times 304, obtained by multiplying a corresponding values of the scheduled number of write times 401 by 10.

Here, the values of the scheduled numbers of write times 401 are may be used as values of the numbers of write times 304.

(S 903) Next, host status determination unit 114 changes all values of the numbers of write times 304 in logical block counter 117c to the set values generated in step S902.

1-3. Advantageous Effects and the Like

In the conventional non-volatile storage device, the numbers of erase times of physical blocks are averaged by allocating a physical block with a relatively large number of erase times to a logical block with a small number of write times. However, the number of write times corresponding to each logical block depends on the operation of a host device, which instructs the non-volatile storage device to write data.

In other words, when a host device accessing a non-volatile storage device is changed to another host device or when an operation mode of a host device accessing a non-volatile storage device is significantly changed, the value held as the number of write times corresponding to each logical block does not indicate the operation of a current host device.

Also, even in a case where a logical clock which is less accessed is changed to a logical block which is accessed many times due to a change of the operation of the host device, the conventional non-volatile storage device allocates a physical block with a relatively large number of erase times to the logical block, so that there is a risk of further expanding the differences in the number of erase times among the physical blocks.

Therefore, memory controller 110 in accordance with the present disclosure writes data to non-volatile memory 120 having a plurality of physical blocks and reads data from non-volatile memory 120, and includes: control information storage unit 117 configured to hold physical block counter 117b recording the number of erase times for each of the plurality of physical blocks, logical block counter 117c recording the number of write times for each of the plurality of logical blocks, and logical-physical conversion table 117a recording a correspondence between logical block addresses of the plurality of logical blocks and physical block addresses of the plurality of physical blocks; CPU 101 configured to manage physical block counter 117b, logical block counter 117c and logical-physical conversion table 117a, and to write data to any physical block address among the physical block addresses corresponding to a predetermined logical block address among the logical block addresses based on logical-physical conversion table 117a; and host interface 111 configured to connect to host device 200, which is an external device, to transmit data to host device 200 and receive data reception from host device 200. When CPU 101 receives a writing data instruction including a write destination logical block address from host interface 111, CPU 101 updates the number of write times corresponding to the write destination logical block address in logical block counter 117c, and if the number of write times corresponding to the write destination logical block address in logical block counter 117c is relatively large, CPU 101 allocates to the write destination logical block address a physical block address with the number of erase times which is relatively small in physical block counter 117b, among spare blocks not allocated to the logical block addresses in logical-physical conversion table 117a, updates the number of erase times corresponding to the allocated physical block address in physical block counter 117b, and updates logical-physical conversion table 117a. Also, if a state of host device 200 is changed, CPU 101 resets the number of write times in logical block counter 117c to a predetermined value.

Accordingly, it is possible, at the timing at which host device 200 significantly changes the pattern of issuing the write command, to reset the value of logical block counter 117c or preset the value of logical block counter 117c to a value according to a future pattern of issuing the write command. Thus, it is possible to effectively average the numbers of erase times between the plurality of physical blocks with high accuracy, corresponding to the change in the operation of host device 200.

Second Exemplary Embodiment

It was described in the first exemplary embodiment that logical block counter 117c holds the numbers of write times 304 corresponding to all of past data writing operations unless a reset command or a preset command is issued.

In the present exemplary embodiment, logical block counter 117c holds only the numbers of write times within the latest predetermined range of writing data operations. Hereinafter, an example of writing control of logical block counter 117c in accordance with the present exemplary embodiment will be described. Since configurations of memory controller 110 and non-volatile memory 120 in accordance with the present exemplary embodiment are the same as those of the first exemplary embodiment, explanation on them will be omitted.

The present exemplary embodiment differs from the first exemplary embodiment in that, while memory controller 110 in the first exemplary embodiment manages logical block counter 117c in which a single number of write times is corresponded to each logical block address as shown in FIG. 4, the logical block counter used in the present exemplary embodiment is logical block counter 2117c as shown in FIG. 11.

FIG. 11 is a diagram illustrating a configuration of a logical block counter in accordance with the present exemplary embodiment. In FIG. 11, logical block counter 2117c has three sets of the numbers of write times corresponding to logical bock address 301, that is, set A 304a of the numbers of write times, set B 304b of the numbers of write times, and set C 304c of the numbers of write times. The number of write times corresponding to each logical block address is given by a sum of a corresponding number of write times in set A 304a, a corresponding number of write times in set B 304b and a corresponding number of write times in set C 304c. Memory controller 110 manages so that a sum of the numbers of write times corresponding to all logical blocks in each set of the three sets of the numbers of write times does not exceed a predetermined value. The predetermined value in the example of FIG. 11 is 1000.

At the time of factory shipment of non-volatile storage device 100 or immediately after resetting non-volatile storage device 100, all values of the three sets of the numbers of write times in logical block counter 2117c, that is, all values in set A 304a of the numbers of write times, set B 304b of the numbers of write times and set C 304c of the numbers of write times, are cleared to "0", and "set of the numbers of write times to be updated" 305 is set to "set A of the numbers of write times".

And then, memory controller 110 updates logical block counter 2117c under the control for a writing data operation from host device 200. Memory controller 110 updates "set A of the numbers of write times" of "a set of the numbers of write times to be updated" 305. More specifically, "set A of the numbers of write times" increments a value of the number of write times in set A 304a corresponding to a specified logical block address.

The writing data operation from host device 200 is repeated and the sum of the values in set A 304a of the numbers of write times is 1000. And then, memory controller 110 changes "a set of the numbers of write times to be updated" 305 to "set B of the numbers of write times". Thereafter, memory controller 110 increments a value in set B 304b of the numbers of write times for the writing data operation.

The writing data operation from host device 200 is additionally repeated and the sum of the values in set B 304b of the numbers of write times is 1000. And then, memory controller 110 changes "a set of the numbers of write times to be updated" 305 to "set C of the numbers of write times". Thereafter, memory controller 110 increments a value in set C 304c of the numbers of write times for the writing data operation.

The writing data operation from host device 200 is repeated and the sum of the values in set C 304c of the numbers of write times is 1000. And then, memory controller 110 clears all values in set A 304a of the numbers of write times to zero, that is, deletes previous information of the numbers of write times.

And then, memory controller 110 changes "a set of the numbers of write times to be updated" 305 to "set A of the numbers of write times". Thereafter, memory controller 110 increments a value in set A 304a of the numbers of write times for the writing data operation. Subsequently, clearing and updating will be repeated in the order of set A of the numbers of write times, set B of the numbers of write times and set C of the numbers of write times.

By the control as described above, logical block counter 2117c stores only the numbers of write times within the latest predetermined range. Accordingly, even if host device 200 is significantly changed the pattern of issuing a write command, the numbers of write times to be updated are reset after the writing data operation is repeated at a predetermined number of times. This allows memory controller 110 to respond to a change in a state of host device 200 and to reconfigure logical block counter 2117c so as to be appropriate for a new pattern of issuing the write command, without any command from host device 200. Accordingly, it is possible to provide memory controller 110 and non-volatile storage device 100 which can average the numbers of erase times corresponding to physical blocks with high accuracy, while responding to a change in operation of host device 200.

Incidentally, in the above exemplary embodiment, the sets of the numbers of write times were three sets, that is, set A of the numbers of write times, set B of the numbers of write times, and set C of the numbers of write times. However, the sets of the numbers of write times may be two sets or four or more sets.

Other Exemplary Embodiments

In the above description, first and second exemplary embodiments have been described as examples of techniques disclosed in the present application. However, the techniques according to the present disclosure are not limited to the above-described exemplary embodiments, and may be applied to other exemplary embodiments in which modifications, substitutions, additions, and/or omissions are made. Also, the structural components described in the above first and second exemplary embodiments may be appropriately combined to configure a new exemplary embodiment.

Examples of such other exemplary embodiments will be described hereinafter.

In the first exemplary embodiment, writing schedule information 400 shown in FIG. 10 is generated, for example, as follows. CPU 211 of host device 200 executes a test mode or the like for memory controller 110. Memory controller 110 counts the number of write times in logical block counter 117c in a specified application or in a specified mode. Memory controller 110 obtains output values of logical block counter 117c, and the numbers of write times for each of logical block addresses, and transmits the obtained values to host device 200. CPU 211 of host device 200 generates writing schedule information 400 based on the received output values of logical block counter 117c, and stores the generated writing schedule information 400 in storage unit 217. When host device 200 issues a preset command, host device 200 transmits the stored writing schedule information 400 to memory controller 110.

Although each of logical block counters 117c and 2117c in the first and second exemplary embodiments counts the number of write times, the logical block counter may instead counts the number of times of access including both reading data operation and writing data operation.

In each of the first and second exemplary embodiments, each of functional blocks in memory controller 110 and host device 200 may be individually implemented by a semiconductor circuit such as an LSI (Large Scale Integration) or the like on a single chip or a part or all of the functional blocks may be implemented on a single chip. The semiconductor circuit may be configured to realize a desired function only by hardware or by hardware in cooperation with software. The semiconductor circuit may be configured, for example, by an Application Specific Integrated Circuit (ASIC), a Field Programmable Gate Array (FPGA), a CPU, a Micro Processing Unit (MPU) or a microcomputer.

The semiconductor circuit referred to as the LSI in the above is also sometimes called an Integrated Circuit (IC), a system LSI, a super LSI or an ultra LSI depending on the degree of integration. Also, the integrated circuit techniques may not be limited to the LSI, and may be a dedicated circuit or a general purpose processor. The other possible integrated circuit techniques include an FPGA, which is an LSI that is programmable after manufacturing, and a re-configurable processor, which is an LSI that has reconfigurable connections or settings of circuit cells in the LSI.

A sequence of executing processing methods in the first and second exemplary embodiments may not necessarily be limited to those described in the above exemplary embodiments, and the sequence of executing may be changed without departing from a scope of the present disclosure.

memory controller 110, non-volatile storage device 100 including memory controller 110 and non-volatile memory 120, non-volatile storage system 1 including non-volatile storage device 100 and host device 200, in the first and second exemplary embodiments, a memory control method executed in the first and second exemplary embodiments, a computer program executing the memory control method, and a computer-readable storage medium in which the computer program is stored, are included within a scope of the present disclosure. Here, the computer-readable storage medium includes, for example, a flexible disk, a hard disk, a Compact Disc Read-Only Memory (CD-ROM), a Magneto-Optical disc (MO), a Digital Versatile Disc (DVD), a DVD-ROM, a DVD-RAM, a Blu-ray (Registered Trademark) Disc (BD), and a semiconductor memory.

The above computer program may not be limited to a program stored in the above storage medium, and may be a program transmitted, for example, via an electrical communication line, a wireless or wired communication line, or a network represented by the Internet.

In the above, the exemplary embodiments have been described as examples of the present disclosure. For the purpose of the description, the accompanying drawings and the detailed description have been provided.

Accordingly, the components shown in the drawings and described in the detailed description may include not only components that are essential to solve the problems, but also components that are for exemplifying the above-described techniques and thus are not essential to solve the problems. Therefore, it should not be recognized that such non-essential components are essential immediately for the reason that they are shown in the drawings or described in the detailed description.

Since the above-described exemplary embodiments are disclosed for the purpose of showing examples of techniques in accordance with the present disclosure, various modifications, substitutions, additions, or omissions may be made within a scope of the claims and equivalents thereof.

What is claimed is:

1. A memory controller for writing data to a non-volatile memory having a plurality of physical blocks, and reading data from the non-volatile memory, the memory controller comprising:
  a memory configured to hold a physical block counter recording a number of erase times for each of the plurality of physical blocks, a logical block counter recording a number of write times for each of a plurality of logical blocks, and a logical-physical conversion table recording a correspondence between logical block addresses of the plurality of logical blocks and physical block addresses of the plurality of physical blocks, the logical-physical conversion table further recording spare blocks allocated to physical block addresses;
  a control unit configured to manage the physical block counter, the logical block counter, and the logical-physical conversion table, and to write data to any physical block address among the physical block addresses corresponding to a predetermined logical block address among the logical block addresses based on the logical-physical conversion table; and
  a host interface configured to connect to an external device, and to transmit data and receive data,
  wherein, when the control unit receives a writing data instruction including a write destination logical block address from the host interface,
    the control unit updates the number of write times corresponding to the write destination logical block address in the logical block counter, and
    if the number of write times corresponding to the write destination logical block address in the logical block counter is relatively large, the control unit
      allocates a physical block address corresponding to the write destination logical block address to the physical block address the number of erase times, which is relatively small and corresponding to a spare block, and
      updates the number of erase times corresponding to the allocated physical block address in the physical block counter, and updates the logical-physical conversion table, and
  wherein, if a state of the external device is changed, the control unit presets the number of write times in the logical block counter to a predetermined value, and at least one of the predetermined values preset to the number of write times for each of the plurality of the logical blocks is other than zero, and
  wherein the predetermined value preset to the number of write times for each of the plurality of the logical blocks is calculated based on a number of write commands to be issued to each of the plurality of the logical blocks.

* * * * *